(12) United States Patent
Dudley

(10) Patent No.: US 6,379,410 B1
(45) Date of Patent: Apr. 30, 2002

(54) AIR FILTER ASSEMBLY FOR MOTOR VEHICLES

(75) Inventor: Lynn A. Dudley, Chino, CA (US)

(73) Assignee: Vortox Company, Claremont, CA (US)

( * ) Notice: Subject to any disclaimer, the term of this patent is extended or adjusted under 35 U.S.C. 154(b) by 0 days.

(21) Appl. No.: 09/574,442

(22) Filed: May 19, 2000

(51) Int. Cl.[7] .............................................. B01D 50/00
(52) U.S. Cl. ......................... 55/385.3; 55/490; 55/495; 55/497; 55/502; 55/508; 55/510
(58) Field of Search ............................ 55/385.1, 385.3, 55/490, 498, 502, 508, 510

(56) References Cited

U.S. PATENT DOCUMENTS

| | | | | |
|---|---|---|---|---|
| 2,614,654 A | * | 10/1952 | Strinden | 55/385.3 |
| 3,537,240 A | * | 11/1970 | Weidinger et al. | 55/385.3 |
| 4,012,211 A | * | 3/1977 | Goetz | 55/385.3 |
| 4,157,902 A | * | 6/1979 | Tokar | 55/385.3 |
| 4,208,197 A | * | 6/1980 | Yakimowich et al. | 55/385.3 |
| 4,299,603 A | * | 11/1981 | Friesen | 55/385.3 |
| 4,366,878 A | * | 1/1983 | Warf | 55/385.3 |
| 5,895,510 A | * | 4/1999 | Butler et al. | 55/510 |
| 5,944,603 A | * | 8/1999 | Guinn et al. | 55/385.3 |
| 5,985,142 A | * | 11/1999 | Belden | 55/498 |

* cited by examiner

*Primary Examiner*—David A. Simmons
*Assistant Examiner*—Minh-Chau T. Pham
(74) *Attorney, Agent, or Firm*—Boniard I. Brown

(57) ABSTRACT

An air filter assembly typically for use with truck-trailer cobinations, has separable body and bottom sections, and an elongted threaded member rotatable for threaded securement between the body and bottom sections and for disengagement of the bottom section from the body section for the removal and replacement of a element via the lower portion of the body section.

19 Claims, 3 Drawing Sheets

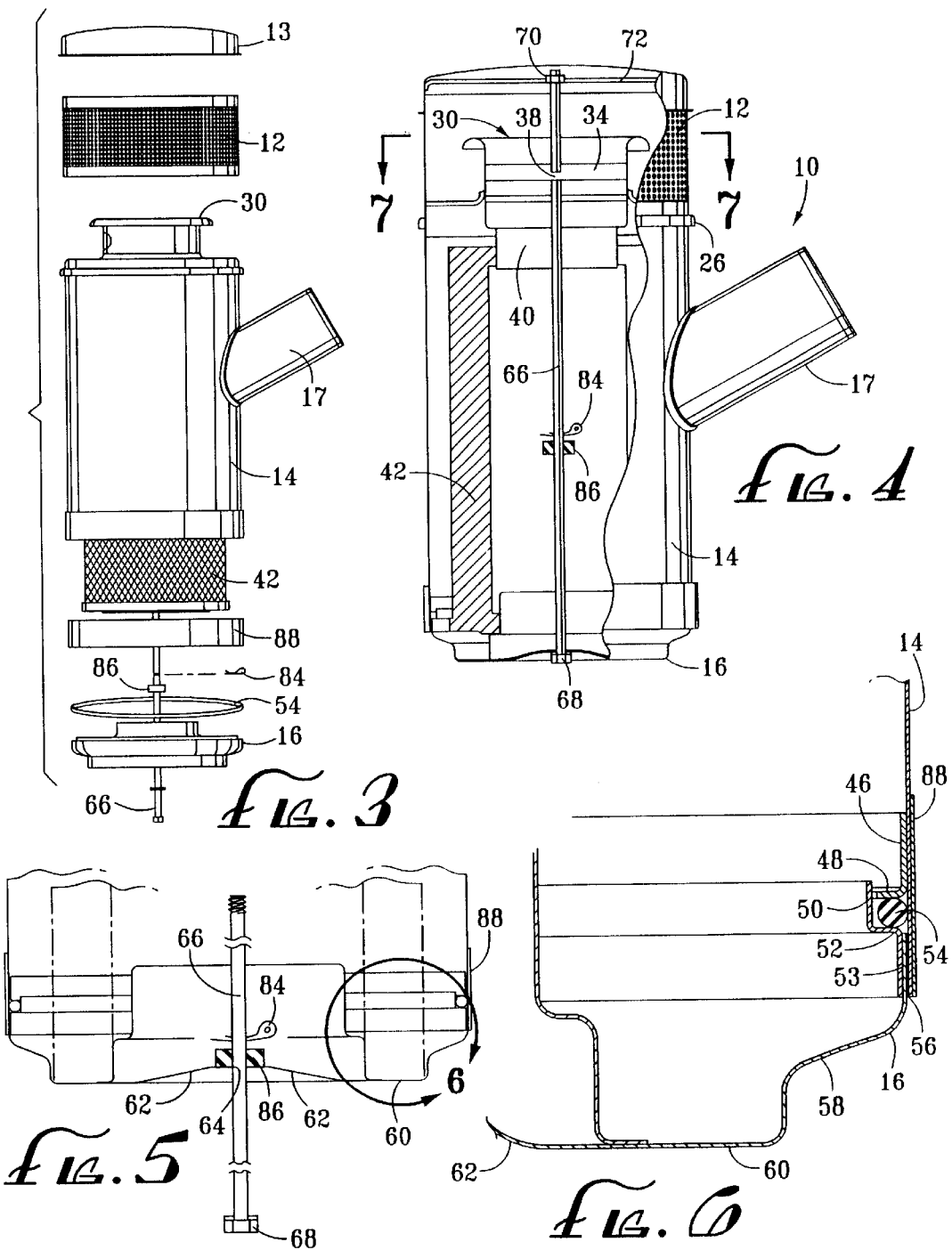

Figure 1:
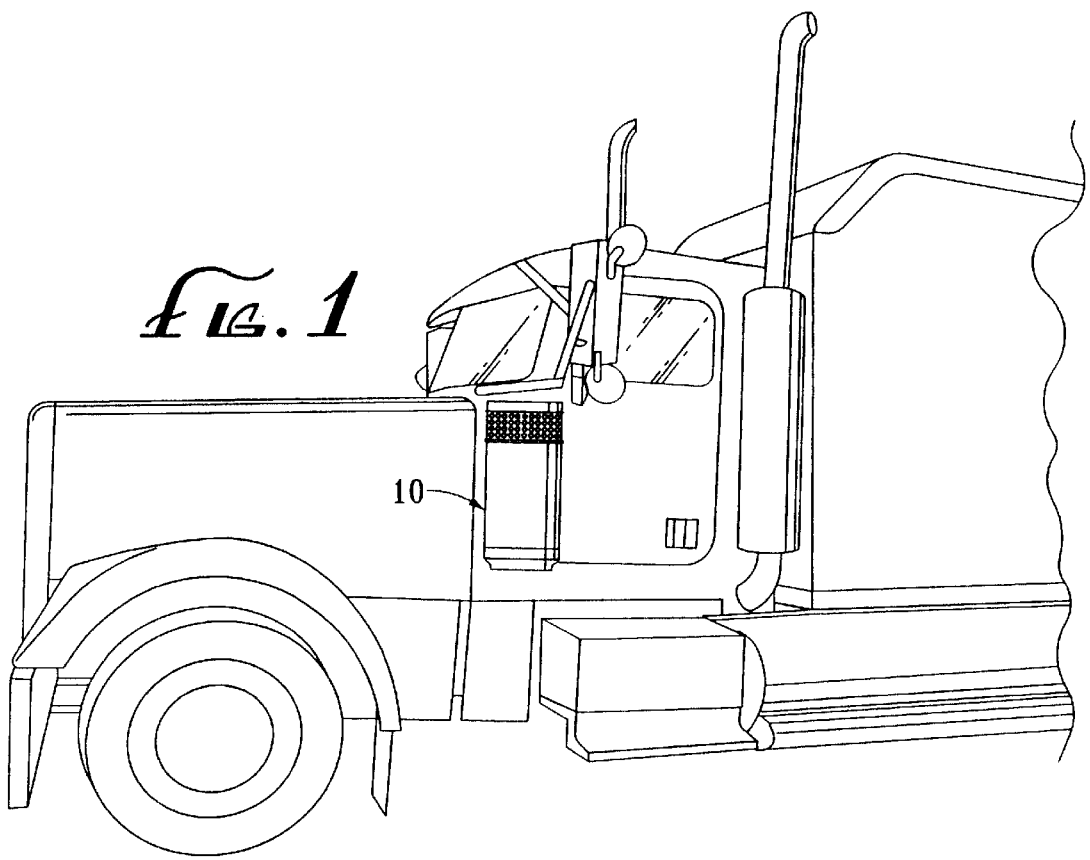
Figure 2:
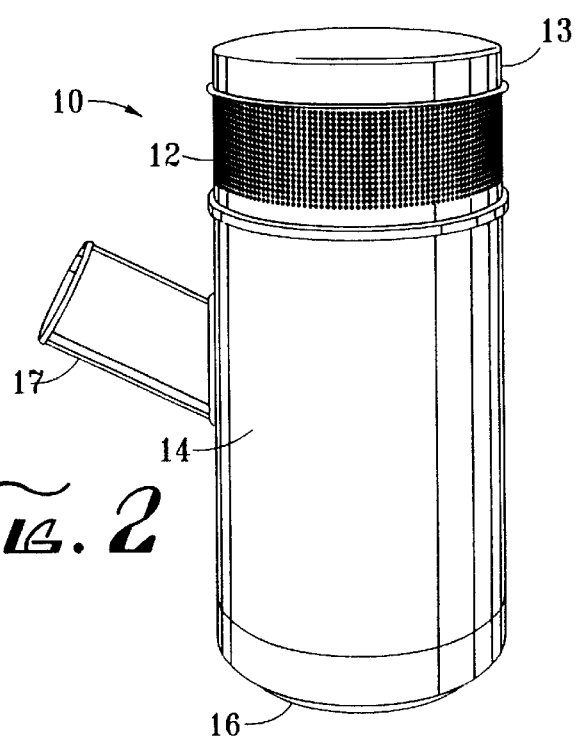
Figure 7:
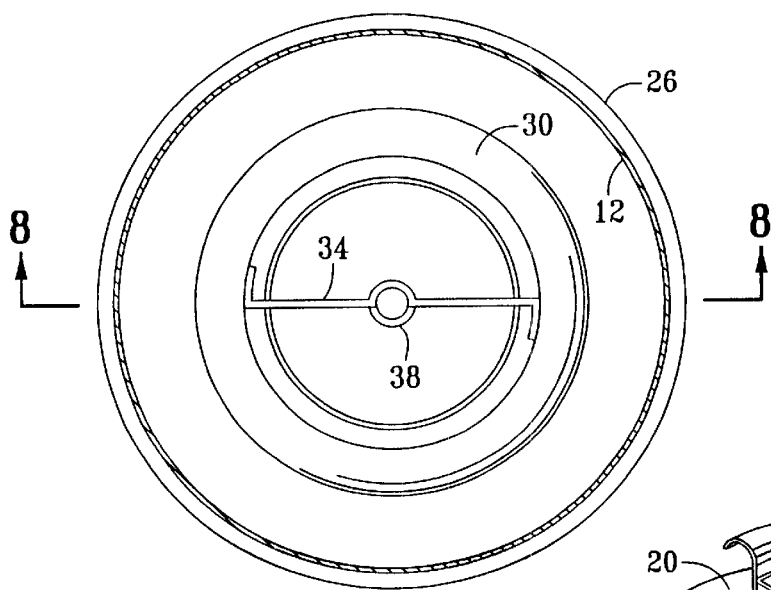
Figure 9:
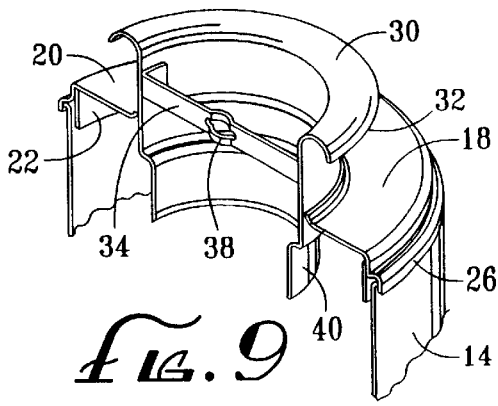
Figure 8:
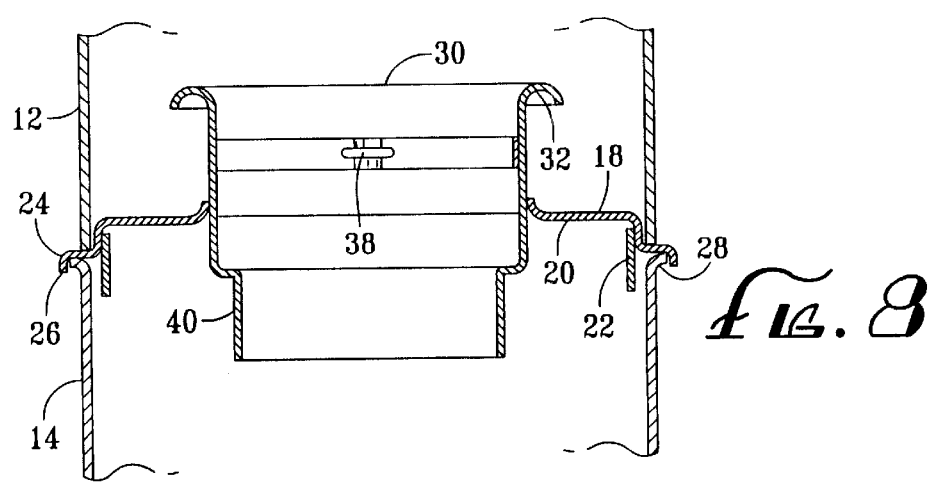

AIR FILTER ASSEMBLY FOR MOTOR VEHICLES

BACKGROUND AND SUMMARY OF THE INVENTION

Air filter assemblies of substantial size are typically mounted on the sides of the cabs of truck-trailer combinations. Air filter elements of such assemblies require periodic replacement. Replacement of the elements is generally accomplished by removal of a top portion of a filter assembly which is removed and then replaced after insertion of a new filter element.

In the removal of a filter element from an assembly, it is ordinarily necessary to remove adjacent devices from the truck or cab, these including such items as mirror brackets, search light assemblies, etc. Removal and replacement of such items often involve damage such as the scratching and flaking of paint coatings, denting of metal, etc.

Added charges are made for such removal and replacement of components not related to filter replacement, and is particularly aggravating to drivers and operators when additional charges are made in addition to those for filter replacement, oil changes and other services.

The present invention eliminates problems and service charges associated with removal of a filter element via upper portion or top of a filter assembly. Thus, the invention provides an air filter assembly for a motor vehicle, the cab truck portion thereof, comprising upper, body and bottom portions or sections, with a bottom section being removably attached to the body portion. An elongate member or rod extends from a wall of the bottom section to engage a threaded member in the upper portion, whereby the rod head portion is rotatable to engage its threaded end portion with, and to disengage it from, the threaded member in the upper portion for detachment of the bottom section from the body portion for the removal and replacement of the filter element.

BRIEF DESCRIPTION OF THE DRAWINGS

FIG. 1 is a perspective view of a portion of a truck-trailer combination with a filter assembly of the invention thereon;

FIG. 2 is a perspective view of a filter assembly according to the invention;

FIG. 3 is an exploded elevational view of the filter assembly of FIG. 2, showing components thereof;

FIG. 4 is an elevational view, partially in section, of the filter assembly of FIGS. 2 and 3;

FIG. 5 is an enlarged partial view of the lower portion of the filter assembly of FIG. 4;

FIG. 6 is an enlarged view taken at circle 6 in FIG. 5;

FIG. 7 is a sectional view taken at line 7—7 in FIG. 4;

FIG. 8 is a sectional view taken at line 8—8 in FIG. 7; and

FIG. 9 is a perspective sectional view of a portion of the filter assembly shown in FIG. 8.

DESCRIPTION OF THE PREFERRED EMBODIMENT

Referring to FIGS. 3 and 4 of the drawings, the filter assembly 10 of the invention is shown as comprising a housing having an upper detachable perforated intake section 12, a removable cap 13, a body section 14, and a detachable bottom section 14, and a detachable bottom section 16. Extending laterally from the body section is an outlet tube 17 which is connected with a turbocharger engine for input of filtered air.

Referring to FIG. 8, a generally annular support member 18 with a transverse portion 20, a generally axial portion, a radial portion 24, and an end portion 26, rests atop a bent end portion 28 of the wall of body section 14. The transverse portion 20 is secured, as by spot-welding at 28, to the lower section 14.

A tube 30 is secured, as by spot-welding, in the opening of member 18, and has an upper curved portion 32. A bracket 34 extends across the tube 30 to support a metal guide 38 which is integral with the bracket. A lower reduced portion 40 of tube 30 receives thereabout generally tubular filter element 42 which is supported on bottom section 16 of the assembly.

Secured, as by welding, in the lower inner portion of the wall of body section 14 is an annular member 46 of generally L-shaped cross-section.

Bottom section 16 has an upper reduced portion 50 and an annular shoulder 52. An annular resilient seal 54 is disposed between a portion 48 of member 46 and the shoulder portion 52 of bottom section 16 (FIG. 6). The portions 50, 52 and a portion 53 of the bottom section provide structural rigidity. Upper portion 56 of bottom section 16 is disposed between the lower end portion of the wall of body 14 and wall portion 53. The bottom section has a radially inwardly and downwardly extending portion 58 and a transverse bottom wall 60 of upwardly inclined annular configuration and defining a central opening 64.

An elongated rod 66 extends through opening 64 and is retained by its hexagonal head 68. The rod extends axially of the filter assembly and through the guide 38 mounted in tube 30, and thence into engagement with a nut 70 welded to a mounting shield 72 which is secured, as by welding, to the inner wall of cap 13 above 15 the perforated air-intake portion of the upper section. A pin or wavepin 84 extends through a transverse opening in rod 66, as shown, and a rubber cushion member 86 is slidably disposed on the rod below the pin.

In removal of the filter element 42 from the filter assembly, head 68 of the rod is rotated, as by a wrench, to disengage its upper threaded end portion from the nut 70, and the rod is then pulled downwardly to engage cushion 86 and pin 84 with bottom wall 62 of the bottom section 16. By exerting manual force or a sudden pulling force on the rod, bottom section 16 of the assembly is moved from the body section by overcoming the friction or resistance of the seal 54. The entire bottom section is then removed for replacement of the filter element 42. A new filter element in the bottom section 16 is then disposed in the body section 14, and rod 66 is threadedly secured in nut 70 on the body section 14, and rod 66 is threadedly secured in nut 70 on the mounting shield 72 to effect reassembly.

Disposed about the lower portion of body 16 is a band 88 which extends over the lower portion of the wall of body section 14 and the upper portion of the bottom section 16. It is preferably assembled onto the upper section by first subjecting the band to heat, thus to expand it, then positioning it to lower portion of the wall of body section 14, thus to effect a very tight fit. The band provides structural strength, and enhances the appearance of the filter assembly in covering underlying structural features, including spot welding. It also prevents mud and road salt from entering into the structural features. The band may be embossed or imprinted with an appropriate logo or insignia, such as that of the manufacturer.

It will be understood that various changes and modifications may be made from the preferred embodiments discussed above without departing from the scope of the present invention, which is established by the following claims and equivalents thereof.

What is claimed is:

1. An air filter assembly for mounting on a motor vehicle, comprising bottom housing section, an upper housing section and a body housing section, said bottom section being removably attached to the body section,
   one of said sections having perforations for intake of air,
   an outlet for filtered air extending from the filter assembly,
   a threaded member mounted in the upper section,
   a filter element removably disposed in the body section, and
   an elongate member having a head portion rotatably retained in a wall of the bottom section and a threaded end portion opposite from the head portion for engagement with said threaded member in the upper portion,
   whereby the elongate member head portion is rotatable in said bottom section wall to engage the threaded end portion of the elongated member with, and to disengage the threaded end portion from, said threaded member in the upper section for detachment of the bottom section from the body section for removal and replacement of the filter element.

2. A filter assembly according to claim 1, wherein said upper portion is perforated for entry of air to the filter assembly.

3. A filter assembly according to claim 1, wherein said filter element is disposed in said bottom section and the body section.

4. A filter assembly according to claim 1, wherein a resilient annular seal is disposed between the body section and the bottom section.

5. A filter assembly according to claim 4, wherein:
   said resilient annular seal is disposed between outer radially extending wall portions of the bottom section and the body section.

6. A filter assembly according to claim 1, wherein said elongate member is a rod having an upper threaded end portion and a head at its opposite lower portion retained in an opening in a bottom wall of the bottom section.

7. A filter assembly according to claim 6, and further comprising a pin transversely disposed on said rod to engage said wall upon exertion of force on the rod for detaching the bottom section from the body section.

8. A filter assembly according to claim 7, and further including:
   a cushion member slidable on said rod below said pin to engage the bottom wall of the bottom section upon the exertion of force on the rod in a direction for detachment of the bottom section to remove the filter element by engagement of the pin and cushion member with the bottom wall of the bottom section.

9. An air filter assembly for a motor vehicle, comprising:
   an upper housing section perforated for intake of air,
   a housing body section,
   a housing bottom section removably attached to the body section,
   a filter element removably disposed in the body section,
   an outlet for filtered air,
   a resilient annular seal disposed between the body section and the bottom section for sealing therebetween,
   a threaded member mounted in said upper section, and
   an elongate rod having a head portion rotatably engaged at an opening in a wall of the bottom section, and having an opposite threaded end portion to engage said threaded member in the upper section,
   whereby the elongate rod head portion is rotatable to engage the threaded end portion with and to disengage the threaded portion from said threaded member in the upper section for detachment of the bottom section from the body section for removal and replacement of the filter element, and is rotatable to engage the threaded end portion with the threaded member for attaching the bottom section to the body section.

10. A filter assembly according to claim 9, wherein a resilient annular seal is disposed about and between the bottom section and the body section.

11. A filter assembly according to claim 10, wherein:
    said resilient annular seal is disposed between transverse radially extending wall portions of the bottom section and body section.

12. A filter assembly according to claim 11, and further comprising a guide axially disposed in the upper section.

13. A filter assembly according to claim 9, and further including:
    a tubular member mounted therein with a lower portion extending into said filter element.

14. A filter assembly according to claim 13, wherein said tubular member has an arcuate upper wall portion for rigidity.

15. A filter assembly according to claim 13, and further including:
    a bracket on said tubular member having a guide thereon, and wherein.
    said rod extends through said guide to provide stability and guidance for the rod.

16. A filter assembly according to claim 9, and further comprising a pin extending transversely and outwardly of the rod.

17. A filter assembly according to claim 16, and further comprising:
    a cushion slidable on the rod below said pin to engage the bottom wall of the bottom section upon exertion of separating force on the rod to disengage the bottom section from the body section for removal of the filter element upon exertion of downward force against the bottom wall of the bottom section to cushion impact of the pin on the bottom wall to separate the bottom section from the body section.

18. A filter assembly according to claim 9, wherein said rod head portion is engagable by a wrench for manual rotation.

19. A filter assembly according to claim 9, wherein said upper section is perforated for entry of air to the filter assembly.

* * * * *